United States Patent
Jin et al.

(10) Patent No.: US 11,401,213 B2
(45) Date of Patent: Aug. 2, 2022

(54) METHOD FOR PREPARING COMPOSITE METAL OXIDE HOLLOW FIBRE

(71) Applicant: Nanjing University of Technology, Nanjing (CN)

(72) Inventors: Wanqin Jin, Nanjing (CN); Jiawei Zhu, Nanjing (CN); Zhengkun Liu, Nanjing (CN)

(73) Assignee: Nanjing University of Technology, Nanjing (CN)

( * ) Notice: Subject to any disclaimer, the term of this patent is extended or adjusted under 35 U.S.C. 154(b) by 480 days.

(21) Appl. No.: 16/466,066

(22) PCT Filed: May 10, 2017

(86) PCT No.: PCT/CN2017/083749
§ 371 (c)(1),
(2) Date: Jun. 3, 2019

(87) PCT Pub. No.: WO2018/107648
PCT Pub. Date: Jun. 21, 2018

(65) Prior Publication Data
US 2020/0062657 A1 Feb. 27, 2020

(30) Foreign Application Priority Data
Dec. 13, 2016 (CN) .......................... 201611145840.2

(51) Int. Cl.
*C04B 35/622* (2006.01)
*C04B 26/10* (2006.01)
(Continued)

(52) U.S. Cl.
CPC ........ *C04B 35/62231* (2013.01); *C04B 26/10* (2013.01); *C04B 26/285* (2013.01);
(Continued)

(58) Field of Classification Search
None
See application file for complete search history.

(56) References Cited

U.S. PATENT DOCUMENTS

2008/0176056 A1* 7/2008 Kilgus ................... C04B 35/80
428/222
2008/0272345 A1* 11/2008 Werth ................. H01M 8/1246
252/519.51
(Continued)

FOREIGN PATENT DOCUMENTS

| CN | 101905121 A | 12/2010 |
|---|---|---|
| CN | 103349918 A | 10/2013 |
| CN | 103768965 A | 5/2014 |

*Primary Examiner* — John J Figueroa
(74) *Attorney, Agent, or Firm* — PROI Intellectual Property US; Klaus Michael Schmid

(57) ABSTRACT

The invention relates to a method for preparing a composite metal oxide hollow fibre. A certain stoichiometry of composite metal oxide raw material and a polymer binding agent are added to an organic solvent, and mixed mechanically to obtain an evenly dispersed spinning solution having a suitable viscosity. After defoaming treatment, the spinning solution is extruded through a spinneret and, after undergoing a certain dry spinning process, enters an external coagulation bath; during this period, a phase inversion process occurs and composite metal oxide hollow fibre blanks are formed. The blanks are immersed in the external coagulation bath and the organic solvent is displaced; after natural drying, the blanks undergo a heat treatment process; during this period, polymer burn off, in situ reaction, and in situ sintering processes occur to obtain the composite metal oxide hollow fibre.

7 Claims, 2 Drawing Sheets

(51) Int. Cl.
  *C04B 26/28* (2006.01)
  *C04B 35/26* (2006.01)
(52) U.S. Cl.
  CPC .. *C04B 35/2633* (2013.01); *C04B 2235/3201* (2013.01); *C04B 2235/3208* (2013.01)

(56) References Cited

U.S. PATENT DOCUMENTS

| | | | | |
|---|---|---|---|---|
| 2010/0018394 | A1* | 1/2010 | Ekiner | C04B 35/6264 95/54 |
| 2012/0082922 | A1* | 4/2012 | Yamaki | H01M 4/521 429/532 |
| 2013/0025458 | A1* | 1/2013 | Li | D01D 5/24 96/10 |
| 2013/0025459 | A1* | 1/2013 | Kosuri | D01F 9/10 96/10 |

* cited by examiner

METHOD FOR PREPARING COMPOSITE METAL OXIDE HOLLOW FIBRE

FIELD OF THE INVENTION

The invention relates to a method for preparing composite metal oxide hollow fibers, in particular to a method for preparing composite metal oxide hollow fibers directly from earth-abundant raw chemicals.

BACKGROUND OF THE INVENTION

Composite metal oxide (e.g., fluorite, perovskite and pyrochlore) hollow fibers, with distinct merits of high specific surface area, rapid thermal cycling and fast mass transfer, have featured great application prospects in various energy- and environmental-related applications (e.g., ceramic fuel cells, membranes for gas separation and catalytic membrane reactors). However, at present, composite metal oxide hollow fibers are normally prepared through multiple processing steps, including high temperature synthesis of composite metal oxide powder, preparation of hollow fiber precursors through phase-inversion, and sintering. Overall, such a preparation method is actually labor-, energy-, and time-consuming, and environmentally unfriendly. In addition, during phase inversion, some composite metal oxides will react with the polar solvents or non-solvents, destroying their physicochemical properties, thus causing poor performance for the resultant hollow fibers. Therefore, it is urgent to develop an extremely simple, economical and reliable method for preparing composite metal oxide hollow fibers.

SUMMARY OF THE INVENTION

The invention aims to provide a revolutionary method for preparing composite metal oxide hollow fibers in order to improve the defects of the prior art. In the invention, the composite metal oxide hollow fibers are obtained from the raw chemicals for composite metal oxides by means of directly performing the phase inversion and a thermal treatment process. The invention successfully solves problems with traditional methods, specifically leaves out the process of high temperature synthesis of composite metal oxide powder, successfully avoids the reaction between the composite metal oxide and the phase inversion system, precisely controls the stoichiometry of the composite metal oxide, and creates excellent conditions for large-scale application of the composite metal oxide hollow fibers.

The technical solution of the invention is as follows: a method for preparing composite metal oxide hollow fibers, specifically a method for obtaining composite metal oxide hollow fibers from the raw chemicals for composite metal oxides by means of directly performing phase inversion (spinning) and a one-step thermal treatment process (solid-state reaction and sintering), which is characterized by comprising the following steps: raw chemical for the composite metal oxide and a polymer binding agent are added to an organic solvent, and mixed mechanically to obtain an evenly dispersed spinning solution; after defoaming treatment, the spinning solution is extruded through a spinneret and, filling liquid from the spinneret passes through a dry air gap into an external coagulation bath and then is solidified to form composite metal oxide hollow fiber precursors; the precursors are immersed in the external coagulation bath to displace the organic solvent; after natural drying, the precursors are placed in a high temperature furnace for sintering; and polymer burn-off, in situ reaction (i.e., solid phase reaction) and in situ sintering processes occur to obtain the composite metal oxide hollow fibers.

Preferably, the composite metal oxide is one or a mixture of perovskite oxide, fluorite oxide, $K_2NiF_4$ oxide, pyrochlore oxide or Brownmillerite oxide.

Preferably, the raw chemical for the composite metal oxide is a mixture of two or more of carbonates or metal oxides, does not chemically react with the filling liquid or the coagulation bath, and has a particle size of 0.1 to 20 μm.

Preferably, the polymer binding agent is any of polysulfone, polyethersulfone, polyetherimide, polyvinylidene fluoride or polyacetate cellulose.

Preferably, the organic solvent is any one of N-methylpyrrolidone, N,N-dimethylformamide, N,N-dimethylacetamide or dimethyl sulfoxide.

Preferably, the polymer binding agent has a mass fraction of 10% to 25% in the polymer solution; and the raw chemical for the composite metal oxide has a mass fraction of 40% to 80% in the spinning solution. Preferably, the spinneret has a dry air gap ranging from 0 to 25 cm; the filling liquid of the spinneret is one or a mixture of two or more of water, methanol, ethanol, N-methylpyrrolidone, N,N-dimethylformamide, N,N-dimethylacetamide or dimethyl sulfoxide, at a temperature of 5° C. to 60° C.; and the external coagulation bath is one or a mixture of two or more of water, methanol, ethanol, N-methylpyrrolidone, N,N-dimethylformamide, N,N-dimethylacetamide or dimethyl sulfoxide, at a temperature of 5° C. to 60° C.

Preferably, the sintering temperature is 1000 to 1500° C., and the holding time is 2 to 20 hours.

Beneficial Effects

The process of the invention is extremely simple and energy-saving, and does not require expensive equipment. Compared with traditional methods for preparing composite metal oxide hollow fibers, the method saves time by more than 50%, and reduces energy consumption by more than 50%. Moreover, the performance of the hollow fibers is greatly improved. The prepared composite metal oxide hollow fibers have a wide scope of application and remarkable use value.

DESCRIPTION OF PREFERRED EMBODIMENTS

Example 1

Figure 1:
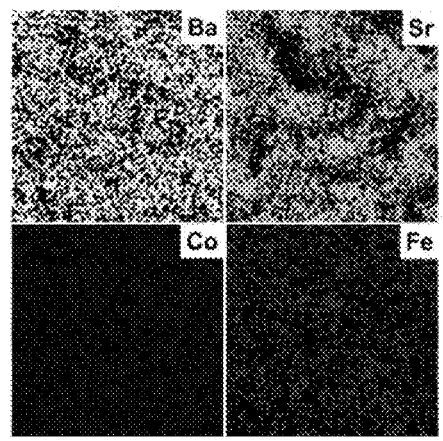
FIG. 1 is a distribution diagram of metal elements of hollow fiber precursors.
Figure 2:
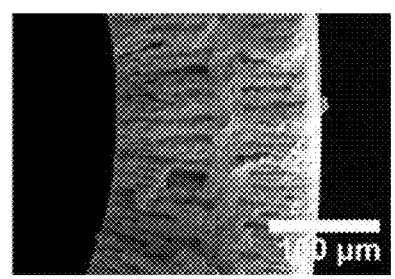
FIG. 2 is a morphological view of a hollow fiber.
Figure 3:
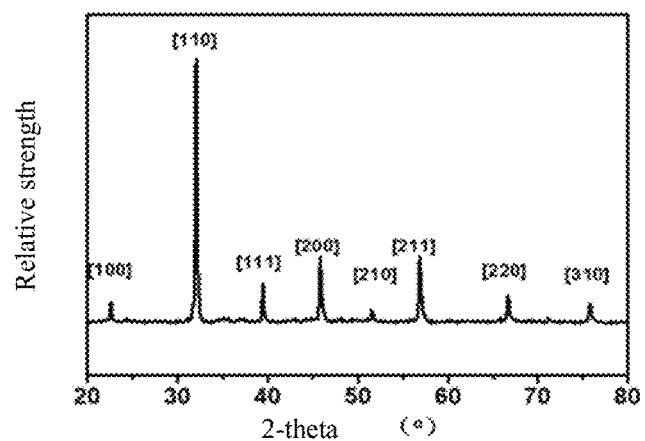
FIG. 3 is an X-ray diffraction diagram of a hollow fiber material.
Figure 4:
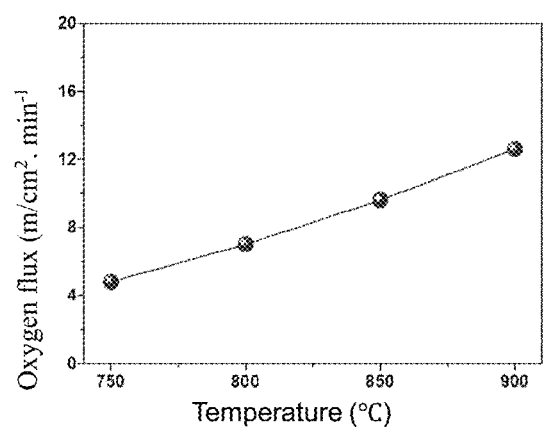
FIG. 4 is an oxygen permeability diagram of the hollow fiber.

Analytically pure $SrCO_3$, $BaCO_3$, $Co_2O_3$ and $Fe_2O_3$, with a particle size of about 0.2 μm, were used as raw chemicals for the $Ba_{0.5}Sr_{0.5}Co_{0.8}Fe_{0.2}O_{3-\delta}$ perovskite oxide. A certain stoichiometry of the raw chemicals and polyethersulfone were added to N-methylpyrrolidone, and mechanically mixed to obtain an evenly dispersed spinning solution. The mass ratio of raw chemical powder, polymer to organic solution in the spinning solution was 7:1:4. After defoaming treatment, the spinning solution was extruded through a spinneret and passed through a dry air gap (0 cm) into a 40° C. external coagulation water bath, and filling liquid of the spinneret, 15° C. water, was solidified to form hollow fibers precursors. Raw chemicals in the precursors were evenly dispersed (FIG. 1). The precursors were immersed in the external coagulation water bath to displace the N-methylpyrrolidone; after natural drying, the precursors were placed in a high temperature furnace, heated to 1000° C. and held for 5 hours to obtain complete hollow fibers with a porous dense structure (FIG. 2). The hollow fibers had a very good perovskite crystalline structure (FIG. 3), could be directly used for oxygen separation and catalytic membrane reaction. When applied as the membranes for oxygen separation, as shown in FIG. 4, their oxygen permeation fluxes reached 12.5 ml min$^{-1}$ cm$^{-2}$ at 900° C.

Example 2

Analytically pure $La_2O_3$, $WO_3$, $SrCO_3$ and $Cr_2O_3$, with a particle size of about 1 μm, were used as raw chemicals for the composite metal oxide of $La_{5.5}WO_{11.25-\delta}$-$La_{0.87}Sr_{0.13}CrO_{3-\delta}$. A certain stoichiometry of the raw chemicals and polyetherimide were added to N,N-dimethylformamide, and mechanically mixed to obtain an evenly dispersed spinning solution. The mass ratio of raw chemical powder, polymer to organic solution in the spinning solution was 12:1:3. After defoaming treatment, the spinning solution was extruded through a spinneret and passed through a dry air gap (5 cm) into a 45° C. external coagulation ethanol bath, and filling liquid of the spinneret, 55° C. ethanol, was solidified to form hollow fiber precursors. Raw chemicals in the precursors were evenly dispersed. The precursors were immersed in the external coagulation bath to displace the N,N-dimethylformamide; after natural drying, the precursors were placed in a high temperature furnace, heated to 1350° C. and held for 15 hours to obtain complete dense hollow fibers which can be directly used for hydrogen separation and catalytic membrane reaction.

Example 3

Analytically pure $CeO_2$ and $Sm_2O_3$ with a particle size of about 5 μm, were used as raw chemicals for fluorite-type $Ce_{0.85}Sm_{0.15}O_{1.9}$. A certain stoichiometry of the raw chemicals and polysulfone were added to N,N-dimethylacetylamide, and mechanically mixed to obtain an evenly dispersed spinning solution. The mass ratio of raw chemical powder, polymer to organic solution in the spinning solution was 14:1:4. After defoaming treatment, the spinning solution was extruded through a spinneret and passed through a dry air gap (10 cm) into an 8° C. external coagulation methanol bath, and filling liquid of the spinneret, a 12° C. mixture of N-methylpyrrolidone and water (at a mass ratio of 1:1), was solidified to form hollow fiber precursors. Raw chemicals in the precursors were evenly dispersed. The precursors were immersed in the external coagulation bath to displace the N,N-dimethylacetamide; after natural drying, the precursors were placed in a high temperature furnace, heated to 1250° C. and held for 10 hours to obtain complete dense hollow fibers which can be directly used in fuel cells.

Example 4

Analytically pure $BaCO_3$, $CeO_2$, $ZrO_2$, $Y_2O_3$ and $Yb_2O_3$, with a particle size of about 10 μm, were used as raw chemicals for the perovskite oxide of $BaCe_{0.7}Zr_{0.1}Y_{0.1}Yb_{0.1}O_{3-\delta}$. A certain stoichiometry of the raw chemicals and polyvinylidene fluoride were added to dimethyl sulfoxide, and mechanically mixed to obtain an evenly dispersed spinning solution. The mass ratio of raw chemical powder, polymer to organic solution in the spinning solution was 9:1:8. After defoaming treatment, the spinning solution was extruded through a spinneret and passed through an air gap of 16 cm into an 25° C. external coagulation bath, a mixture of N-methylpyrrolidone and water (at a mass ratio of 1:1), and filling liquid of the spinneret, 35° C. water, was solidified to form hollow fiber precursors. Raw chemicals in the precursors were evenly dispersed. The precursors were immersed in the external coagulation bath to displace the dimethyl sulfoxide; after natural drying, the precursors were placed in a high temperature furnace, heated to 1450° C. and held for 20 hours to obtain complete dense hollow fibers which can be directly used in proton conducting fuel cells.

Example 5

Analytically pure $CaCO_3$, $CeO_2$, $CuO$, $Fe_2O_3$, $Gd_2O_3$ and $La_2O_3$, with a particle size of about 18 μm, were selected as raw chemicals for 75 wt. % $Ce_{0.85}Gd_{0.1}Cu_{0.05}O_{2-\delta}$-25 wt. % $La_{0.6}Ca_{0.4}FeO_{3-\delta}$, the fluorite-perovskite dual-phase oxide. A certain stoichiometry of the raw chemicals and polyacetate cellulose were added to methylpyrrolidone, and mechanically mixed to obtain an evenly dispersed spinning solution. The mass ratio of raw chemical powder, polymer to organic solution in the spinning solution was 5:1:5. After defoaming treatment, the spinning solution was extruded through a spinneret and passed through a dry air gap (23 cm) into an external coagulation bath, a 45° C. mixture of water, methanol and ethanol (at a mass ratio of 1:1:1), and filling liquid of the spinneret, 40° C. dimethyl sulfoxide, was solidified to form hollow fiber precursors. Raw chemicals in the precursors were evenly dispersed. The precursors were immersed in the external coagulation bath to displace the dimethyl sulfoxide; after natural drying, the precursors were placed in a high temperature furnace, heated to 1150° C. and held for 3 hours to obtain the porous hollow fibers which can be directly used for $CO_2$ separation membrane.

Example 6

Analytically pure $Pr_2O_3$, $BaCO_3$, $CaCO_3$ and $Co_2O_3$, with a particle size of about 1 μm, were used as raw chemicals for $PrBa_{0.5}Ca_{0.5}Co_2O_{5+\delta}$ Brownmillerite oxide. A certain stoichiometry of the raw chemicals and polyethersulfone were added to N-methylpyrrolidone, and mechanically mixed to obtain an evenly dispersed spinning solution. The mass ratio of raw chemical powder, polymer to organic solution in the spinning solution was 6:1:4. After defoaming treatment, the spinning solution was extruded through a spinneret and passed through a dry air gap (6 cm) into a 25° C. external coagulation water bath, and filling liquid of the spinneret, 25° C. water, was solidified to form hollow fiber precursors. Raw materials in the precursors were evenly dispersed. The precursors were immersed in the external coagulation water bath to displace the N-methylpyrrolidone; after natural drying, the precursors were placed in a high temperature furnace, heated to 1100° C. and held for 5 hours to obtain complete hollow fibers with a porous dense structure. The hollow fibers had a very good crystalline structure, and could be used in oxygen separation and catalytic membrane reaction.

Example 7

Analytically pure $Pr_2O_3$, $La_2O_3$, NiO, CuO and $Ga_2O_3$, with a particle size of about 0.5 μm, were used as raw chemicals for $K_2NiF_4$-type oxide of $(Pr_{0.9}La_{0.1})_2(Ni_{0.74}Cu_{0.21}Ga_{0.05})O_{4+\delta}$. A certain stoichiometry of the raw chemicals and polyethersulfone were added to N-methylpyrrolidone, and mechanically mixed to obtain an evenly dispersed spinning solution. The mass ratio of raw chemical powder, polymer to organic solution in the spinning solution was 7:1:4. After defoaming treatment, the spinning solution was extruded through a spinneret and passed through a dry air gap (2 cm) into a 25° C. external coagulation water bath, and filling liquid of the spinneret, 25° C. water, was solidified to form hollow fiber precursors. Raw materials in the precursors were evenly dispersed. The precursors were immersed in the external coagulation water bath to displace the N-methylpyrrolidone; after natural drying, the precursors were placed in a high temperature furnace, heated to 1300° C. and held for 5 hours to obtain complete hollow fibers with a porous-dense structure. The hollow fibers had a very good crystalline structure, and could be applied for oxygen separation and catalytic membrane reaction.

Example 8

Analytically pure $SrCO_3$ and $Fe_2O_3$ with a particle size of 0.3 μm, were used as raw chemicals for $Sr_2Fe_2O_7$ pyrochlore oxide. A certain stoichiometry of the raw chemicals and polyethersulfone were added to N-methylpyrrolidone, and mechanically mixed to obtain an evenly dispersed spinning solution. The mass ratio of raw chemical powder, polymer to organic solution in the spinning solution was 9:1:4. After defoaming treatment, the spinning solution was extruded through a spinneret and passed through a dry air gap (5 cm) into a 25° C. external coagulation water bath, and filling liquid of the spinneret, 25° C. water, was solidified to form hollow fiber precursors. Raw chemicals in the precursors were evenly dispersed. The precursors were immersed in the external coagulation water bath to displace the N-methylpyrrolidone; after natural drying, the precursors were placed in a high temperature furnace, heated to 1400° C. and held for 5 hours to obtain complete hollow fibers with a porous-dense structure. The hollow fibers had a very good crystalline structure, and could be directly used in oxygen separation and catalytic membrane reaction.

What is claimed is:

1. A method for preparing composite metal oxide hollow fibers, specifically a method for obtaining composite metal oxide hollow fibers from the raw chemicals for composite metal oxides by means of directly performing phase inversion and a thermal processing step, wherein the method comprises the following steps: raw chemicals for composite metal oxides and a polymer binding agent are added to an organic solvent, and mixed mechanically to obtain an evenly dispersed spinning solution; the spinning solution undergoes a defoaming treatment, the spinning solution is extruded through a spinneret and filling liquid from the spinneret passes through a dry air gap into an external coagulation bath and then is solidified to form composite metal oxide hollow fiber precursors; the precursors are immersed in the external coagulation bath to displace the organic solvent; after natural drying, the precursors are placed in a high temperature furnace for sintering, wherein polymer burn-off, in situ reaction (i.e., solid phase reaction) and in situ sintering processes occur to obtain the composite metal oxide hollow fibers; wherein the raw chemicals for composite metal oxides are a mixture of two or more of carbonates or metal oxides, do not chemically react with the filling liquid or the coagulation bath, and have a particle size of 0.1 to 20 μm.

2. The preparation method according to claim 1, wherein the composite metal oxide is perovskite oxide.

3. The preparation method according to claim 1, wherein the polymer binding agent is polyethersulfone.

4. The preparation process according to claim 1, wherein the organic solvent is any one of N-methylpyrrolidone, N,N-dimethylformamide, N,N-dimethylacetamide or dimethyl sulfoxide.

5. The preparation method according to claim 1, wherein the polymer binding agent has a mass fraction of 10% to 25% in the polymer solution; and the raw chemicals for composite metal oxides have a mass fraction of 40% to 80% in the spinning solution.

6. The preparation method according to claim 1, wherein the spinneret has a dry air gap (air gap) ranging from 0 to 25 cm; the filling liquid of the spinneret is one or a mixture of two or more of water, methanol, ethanol, N-methylpyrrolidone, N,N-dimethylformamide, N,N-dimethylacetamide or dimethyl sulfoxide, at a temperature of 5° C. to 60° C.; and the external coagulation bath is one or a mixture of two or more of water, methanol, ethanol, N-methylpyrrolidone, N,N-dimethylformamide, N,N-dimethylacetamide or dimethyl sulfoxide, at a temperature of 5° C. to 60° C.

7. The preparation method according to claim 1, wherein the sintering temperature is 1000 to 1500° C. and the sintering holding time is 2 to 20 hours.

\* \* \* \* \*